United States Patent Office 3,296,578
Patented Jan. 3, 1967

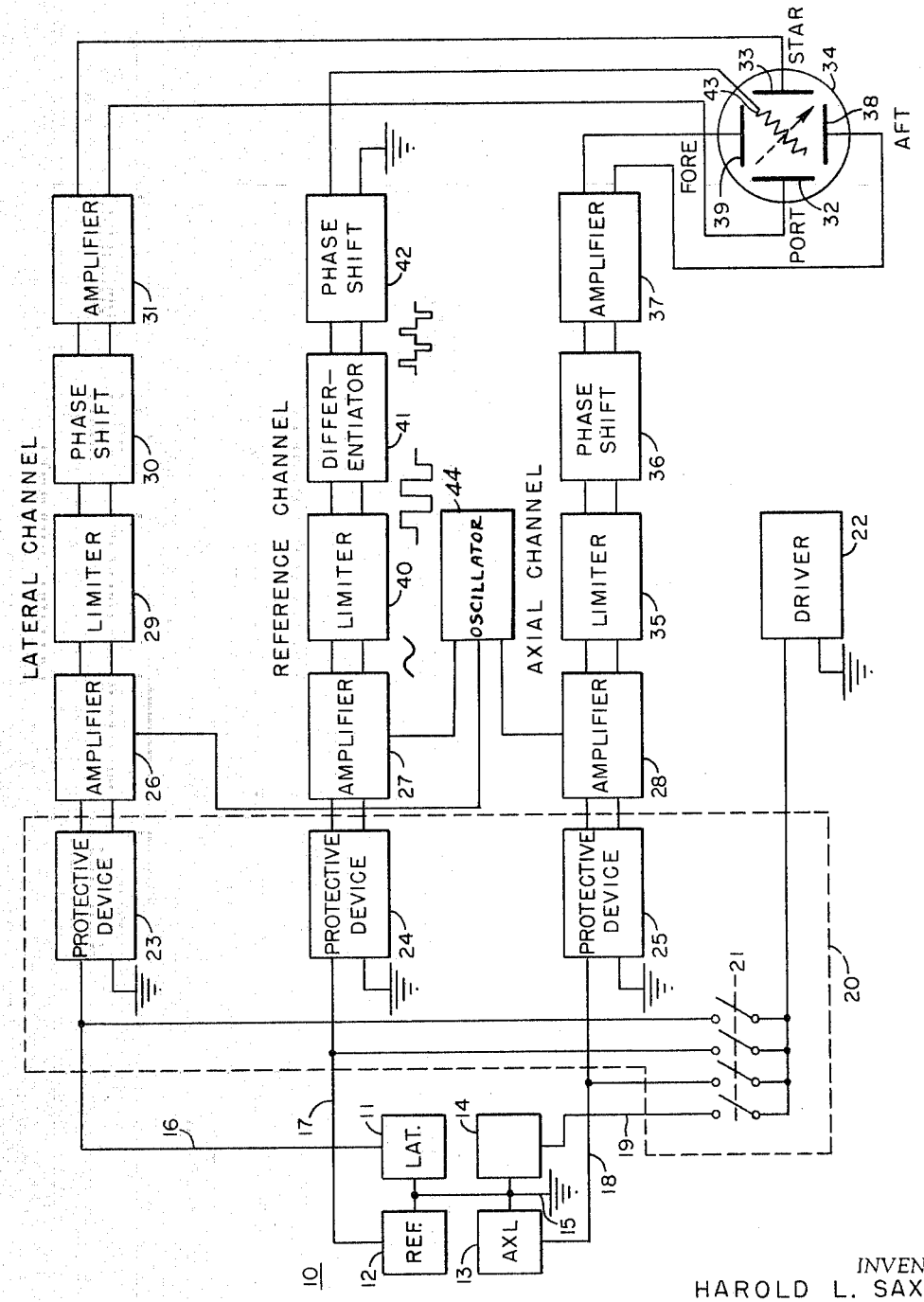

3,296,578
UNDERWATER DIRECTION INDICATOR
Harold L. Saxton, Washington, D.C., and Melvin S. Wilson, Hillcrest Heights, Md. (both % Naval Research Laboratory, Anacostia Station, Washington, D.C. 20360)
Filed Oct. 20, 1950, Ser. No. 191,294
5 Claims. (Cl. 340—3)

The invention described herein may be manufactured and used by or for the Government of the United States of America for governmental purposes without the payment of any royalties thereon or therefor.

The present invention relates in general to sonic direction-finding and more particularly to a method and apparatus for determining the direction of approach of underwater sound waves to determine the direction of the source of, or an object reflecting, such waves.

An object of the invention is the provision of a method and means for determining the direction of approach of underwater sound to a water craft utilizing a transducer carried by the water craft without necessity for movement of the transducer relative to the craft.

Another object of the invention is the provision of a method and means for guiding the approach of water craft to a point substantially over an underwater source of initial or reflected sound waves.

Another object is the provision of a method and means of the above description in which the sensing of the direction may be attained through a presentation on the screen of a cathode ray oscilloscope depicting on the oscilloscope screen the direction of the source of incident or reflected sound relative to the location of the searching water craft.

A further object is the provision of a system of the present type which will afford automatic instantaneous indication eliminating necessity for manual or mechanical manipulation once the system is put into operation.

A further object is the provision of a system of the present type in which the indication is visual and self-explanatory and capable of immediate interpretation without reference to tables or charts.

The above objects are attained in general through the provision of means whereby the sound waves are received at three spaced points of reception differing in phase relation at the point of reception according to the direction from which they arrive and utilization of this instantaneous phase relation at all three points to indicate the direction of approach in two planes perpendicular to each other and to the plane of said points.

Various other objects and advantages of the invention will become apparent from a perusal of the following specification and the drawings accompanying the same.

The drawing is a schematic diagram of a preferred embodiment of the invention.

In this embodiment, three sections of a quarterly split electroacoustic transducer 10 are used, the transducer comprising in a general a transducer split into four independent transducer elements 11, 12, 13 and 14 arranged in close proximity in a common plane. This enables two or more, preferably all four, of the transducer elements to be energized simultaneously as a single large transmitter or projector, and to be used individually as receivers. The invention is concerned mainly with the use of three of the transducer elements as independent receivers. In the present embodiment the transducer element 12 is used as a reference receiver, the element 11 has a laterally spaced receiver, hereinafter referred to as the lateral receiver, and the element 13 as an axially spaced receiver hereinafter referred to as the axial receiver. The centers of area (and phase) of the three receivers are thus spaced at three corners of a square, or the three corners of a right angle isosceles triangle. The several transducer elements are provided with a common return or ground lead 15 and individual leads 16, 17, 18 and 19. It will be understood of course that pairs of leads may be used instead of the single leads with common return. The quarterly split illustrated in the diagram provides a satisfactory relative positioning of centers of phase of the reference, lateral, and axial channels.

The spacing between any two of the receiver elements relative to the wavelength of the signals to be received should of course be such that no usable angle of approach of such signals other than an approach perpendicular to the line of spacing between any two transducers, will the waves reach two of the spaced receivers in phase.

While, in direction finding by echo, the separate transducer 14 may be used alone for transmitting the incident sound, it is preferable to drive the receiving transducer elements 11–13 of the group as well. To achieve this end, a suitable duplexer switching system of any known or other suitable type may be used, such as the one here shown within the dotted line block 20. This system includes a mechanical switch 21 for connecting the driver 22 to all the transducers for simultaneous transmission and protective devices 23, 24 and 25 of known or other suitable form connecting the individual transducer elements 11, 12 and 13 with individual amplifier receivers 26, 27 and 28 respectively. As is understood in the art, these protective devices function to pass the relatively weak signal currents generated by the transducers to the amplifier receivers while protecting the receivers from the relatively strong signal current output of the driver. The amplifiers are preferably of the superheterodyne type using a single local oscillator 44 common to all three.

The output of amplifier 26 is fed through a limiter 29, phase shifter 30 and amplifier 31 to the lateral deflector plates 32–33 of a cathode ray oscilloscope 34. Similarly the output of amplifier 28 individual to the axial transducer is fed through a limiter 35, phase shifter 36 and amplifier 37 to the vertical deflector plates 38–39 of the oscilloscope, for deflecting the cathode ray beam in a direction representing the fore and aft direction of the water craft carrying the search apparatus. The amplifier 27 which receives the signal as it arrives at the reference receiver element 12, has its output fed through a limiter 40, a differentiator 41 and a phase shifter 42 to the intensity control grid 43 of the oscilloscope.

The main function of the channel indicated as a whole on the drawing as the "lateral channel" connecting the lateral receiver element 11 with the oscilloscope 34 is to convert the compressional wave signal as received at the lateral transducer element into oscillatory lateral deflection components at the oscilloscope, tending to oscillate the cathode ray beam laterally across the face of the oscilloscope, the limiter in this channel acting to maintain the amplitude of such oscillations or deflection components substantially constant. Similarly the main function of the channel indicated "axial channel" on the drawing is to convert the compressional wave signal as picked up at the axial transducer element into oscillatory vertical deflection components tending to oscillate the cathode ray beam vertically across the face of the oscilloscope. This channel also includes a limiter 35 to maintain substantially constant the amplitude of the deflection components. Phase shifters 30 and 36 in the lateral and axial channels afford an electrical adjustment of these channels to maintain the phase difference at the deflection plates of the oscilloscope equal to that at the lateral and axial pick-up receivers to offset any unequal phase shifting tendency inherent in such channels.

The function of the channel indicated "reference channel" on the drawing, connecting the reference transducer 12 with the intensity control grid of the oscillograph, is to effect a momentary production of the cathode ray beam or a momentary increase in intensity of an existing, cathode ray beam in the oscilloscope, which effect is hereinafter referred to as spot brightening, at a definite point in the cycle of the compressional wave as received at the reference transducer 12. To this end the output of the amplifier 27 is fed through the limiter 40 and differentiator 41 to convert the signal as received at the reference pick-up receiver 12 into a narrow pulse wave form, which wave form is channeled through the phase shifter 42 to the grid 43 of the oscilloscope.

In the example here being described, it is to be assumed that the deflector plates are so connected to the amplifiers 31 and 37 and the phase shifters 30 and 36 so adjusted, that with a compressional wave signal arriving at all three pickup receivers in phase, the voltages at the deflector plates 33 and 38 will be in phase and the voltages at plates 32 and 39 in phase, so that the resulting components would oscillate the beam, if the latter were present, along a straight line sloping downwardly from left to right at 45° to the horizontal. It is also to be assumed that under the same circumstances the phase shifter 42 of the reference channel is adjusted to place the positive halves of the narrow pulse waves of the reference channel in phase with the instant of the passage of the voltage on plates 33 and 38 through zero during the passage of such voltage from negative to positive, so that spot brightening will occur at the center of the sweep from left to right and top to bottom.

It will be obvious that with phase shifters in both the lateral and axial channels the phase shifter 42 in the reference channel may not be necessary inasmuch as once the proper phase relation is established between the lateral and axial channels, both may be changed in equal degree to establish the desired relative phase between them and the spot brightening pulses without having to change the latter. Conversely where the phase shifter 42 is present one or the other of phase shifters 30 or 36 may not be necessary in that the proper phase relation between the lateral and axial channels may be established by adjustment of one of them, after which the phase shifter in the reference channel may be adjusted to bring the moment of spot brightening to the proper point in the scanning cycle.

When seeking the direction of an original source of sound, the duplexer 20 will not be necessary. However, where echo direction finding is to be practiced the duplexer or its equivalent is necessary to permit use of all four elements of the quaterly split projector as a single large area projector for sending and only the three elements 11, 12 and 13 for receiving.

In operation when a signal arrives at the reference and lateral pick-up transducers in phase then spot brightening occurs in the center or zero phase of the lateral sweep from left to right and before or after the axial sweep reaches zero in passing from top to bottom according as to whether the arrival of the signal at the reference pick-up leads or lags its arrival at the axial pick-up.

If the signal arrives at the pick-up transducers from below and directly fore of the searching craft, then the voltage output of the reference channel will be in phase with that of the lateral channel and lead that of the axial channel and spot brightening will occur at the zero phase of the lateral channel and appear on the vertical center line of the oscilloscope well above or close to center according as to whether the target is at a considerable angle from the vertical or nearly directly below the vessel.

When the signal arrives directly from port and below, then the reference voltage will be in phase with the axial voltage and in lead of the lateral voltage and spot brightening will occur at the zero phase of the axial voltage and appear on the horizontal center line of the oscilloscope well to the left of center or close to the center according as to whether the target is at a considerable angle from the vertical or nearly directly below.

When the signal arrives from fore and port of the searching craft, the reference voltage will lead both the lateral voltage and the axial voltage so that spot brightening will occur some time before the lateral scan passes through zero or center, from left to right and sometime before the axial scan passed through zero or center from top to bottom, so that the spot will appear on the oscilloscope in the second quadrant nearer the vertical or horizontal center line according as to the direction of the target in a horizontal plane and well away from or close to the center according as to whether the target is at a considerable angle from the vertical or nearly directly below.

Horizontal deflection can be calibrated in terms of lateral deviation and vertical deflection in terms of axial (fore and aft) deviation. Direction of spot deflection from center will give a close approximation of the relative bearing of the target provided that such deflection is small for example not over half the maximum registered on the face of the oscilloscope. Thus the accuracy in direction indication increases as the center indication is approached since the sine of the angle of deviation is proportional to the angle, for small angles.

While but one specific embodiment of the invention has been herein described for the sake of disclosure, it is to be understood that the invention is not limited to such specific embodiment but contemplates all modifications and variants thereof as fall fairly within the scope of the appended claims.

What is claimed is:

1. An underwater direction indicator comprising three spaced transducers for converting sound to electrical signals, said transducers being centered substantially on three corners of a square in the plane of said transducers; three alternating current signal paths including superheterodyne amplifiers, said paths each having an input coupled to a different one of said transducers; said amplifiers including a common source of beat frequency oscillations; an oscilloscope including a horizontal deflection input, a vertical deflection input and brightness control input; each of the outputs of said three signal paths being coupled to a different one of the inputs to said oscilloscope; the path to said brightness control including a limiting means for clipping the peaks and substantially squaring oscillatory signals propagating therein and a differentiating means for converting said squared signals to narrow brightening pulses corresponding in amplitude to the transient portions of said squared signals; and manually operated phase shifters located in at least two of said signal paths.

2. An indicator according to claim 1 wherein said paths which are coupled to the horizontal and vertical deflection inputs also include limiting means to provide a constant amplitude limit for signals applied to said deflection inputs.

3. An indicator according to claim 1 wherein said phase shifters are adjusted so that an oscillatory sound wavefront applied simultaneously to each of said transducers produces a brightening pulse at the brightness control input when both deflection input currents are zero.

4. An indicator according to claim 1 further including a high power source of electrical oscillations, switching means to connect said source periodically to all of said transducers simultaneously, and protective means to decouple said first, second and third channels from said transducers only when said source is connected thereto.

5. An indicator according to claim 1 including a fourth transducer located adjacent said first, second and third transducers, a source of electrical oscillations, means to periodically couple said source to said fourth transducer, and protective means for deactivating said first, second and third channels only when said source is so coupled.

References Cited by the Examiner

UNITED STATES PATENTS

| | | | |
|---|---|---|---|
| 2,320,476 | 6/1943 | Schrader et al. | 343—123 |
| 2,400,552 | 5/1946 | Hoover | 177—386.1 |
| 2,434,644 | 1/1948 | Fairweather | 177—3861. |
| 2,524,180 | 10/1950 | Schuck | 177—386.1 |
| 2,646,566 | 7/1953 | McGuigan | 343—123 |

CHESTER L. JUSTUS, *Primary Examiner.*

HILLER MARANS, NORMAN H. EVANS, FREDERICK M. STRADER, *Examiners.*

J. R. SPALLA, P. H. BLAUSTEIN, T. D. JENNINGS, R. A. FARLEY, *Assistant Examiners.*